United States Patent
Lin (10) Patent No.: US 11,811,897 B2
(45) Date of Patent: Nov. 7, 2023

(54) METHOD FOR DATA PROCESSING OF FRAME RECEIVING OF AN INTERCONNECTION PROTOCOL AND STORAGE DEVICE

(71) Applicant: SK hynix Inc., Icheon-si (KR)

(72) Inventor: Fu Hsiung Lin, Zhubei (TW)

(73) Assignee: SK hynix Inc., Icheon-si (KR)

( * ) Notice: Subject to any disclaimer, the term of this patent is extended or adjusted under 35 U.S.C. 154(b) by 1 day.

(21) Appl. No.: 17/562,701

(22) Filed: Dec. 27, 2021

(65) Prior Publication Data

US 2023/0035810 A1 Feb. 2, 2023

(30) Foreign Application Priority Data

Jul. 29, 2021 (TW) .................... 110127848

(51) Int. Cl.
*H04L 69/00* (2022.01)
*H04L 69/324* (2022.01)
*G06F 13/42* (2006.01)

(52) U.S. Cl.
CPC .......... *H04L 69/02* (2013.01); *G06F 13/4282* (2013.01); *H04L 69/324* (2013.01)

(58) Field of Classification Search
CPC .... G06F 13/4282; H04L 69/02; H04L 69/324
See application file for complete search history.

(56) References Cited

U.S. PATENT DOCUMENTS

| | | | |
|---|---|---|---|
| 2011/0078313 A1 | 3/2011 | Radulescu et al. | |
| 2013/0097460 A1* | 4/2013 | Jeong ................ | G11C 29/022 714/37 |
| 2014/0173164 A1* | 6/2014 | Ranganathan ......... | G06F 13/40 710/313 |
| 2016/0274821 A1* | 9/2016 | Park ................... | G06F 13/102 |
| 2021/0149581 A1* | 5/2021 | Kim ................... | G06F 3/0632 |

FOREIGN PATENT DOCUMENTS

| | | |
|---|---|---|
| CN | 105793829 B | 1/2020 |
| JP | 2008546298 A | 12/2008 |
| WO | 2006129294 A1 | 12/2006 |
| WO | 2007116268 A1 | 10/2007 |
| WO | 2008152592 A1 | 12/2008 |
| WO | 2011067381 A1 | 6/2011 |

* cited by examiner

*Primary Examiner* — Thomas J Dailey
(74) *Attorney, Agent, or Firm* — WILLIAM PARK & ASSOCIATES LTD.

(57) ABSTRACT

A method for data processing of frame receiving of an interconnection protocol and a storage device, for use in a first device linkable to a second device according to the interconnection protocol. The method includes: in processing of frames originating from the second device and received by the first device: while sending data contained in a first frame to a network layer from a data link layer, pre-fetching symbols of a second frame; and after the data contained in the first frame are sent to the network layer and the symbols of the second frame are pre-fetched, sending data contained in the second frame to the network layer. Upon receipt of back-to-back frames, the efficiency of the frame receiving at the data link layer is enhanced.

10 Claims, 10 Drawing Sheets

| 16 | 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|---|
| 1 | ESC_DL | | | | | | | SOF | | | | TC | | reserved | | |
| 0 | L2 payload | | | | | | | | | | | | | | | |
| 0 | L2 payload | | | | | | | | | | | | | | | |
| 0 | L2 payload | | | | | | | | | | | | | | | |
| 1 | ESC_DL | | | | | | | EOF_EVEN | | | | frame sequence number | | | | |
| 0 | CRC-16 | | | | | | | | | | | | | | | |

METHOD FOR DATA PROCESSING OF FRAME RECEIVING OF AN INTERCONNECTION PROTOCOL AND STORAGE DEVICE

CROSS-REFERENCE TO RELATED APPLICATION

The present application claims priority under 35 U.S.C. § 119(a) to Taiwanese Patent Application No. 110127848 filed on Jul. 29, 2021, in the Taiwan Intellectual Property Office, which is incorporated herein by reference in its entirety.

BACKGROUND OF THE INVENTION

1. Field of the Invention

The present disclosure relates to electronic devices, and in particular to a method for data processing of frame receiving of an interconnection protocol and a storage device.

2. Description of the Related Art

Owing to the ongoing increase in the data generated and processed by modern mobile devices (for example, computation devices, such as smartphones, tablets, multimedia devices, and body-worn devices), it is necessary to further develop the technology of chip-to-chip or mobile device-dependent interconnect interfaces in the mobile devices in order to fulfill the objectives of high transport speed, low power consumption operation, high expandability, supporting multiplexing, and ease of use.

To this end, the Mobile Industry Processor Interface (MIPI) Alliance developed interconnect interface technology which meets the aforesaid objectives, for example, MIPI M-PHY specifications regarding physical layers and MIPI UniPro specifications regarding Unified Protocol (UniPro). Furthermore, Joint Electron Device Engineering Council (JEDEC) put forth the next-generation, high-performance nonvolatile memory standard, also known as universal flash storage (UFS), according to MIPI M-PHY specifications and universal transport protocol MIPI UniPro specifications. Universal flash storage (UFS) is conducive to high-speed (at the scale of one billion bits per second) transport and low power consumption operation and contributory to the functionality and expandability required for high-level mobile systems, thereby encouraging the industrial sector to adopt them as soon as possible.

Manufacturers developing related chips, electronic modules or electronic devices in accordance with the interconnect interface technology have to ensure product functionality and operation will meet specification. For instance, a system implemented according to the UFS standard comprises a computation device and a storage device provided in the form of nonvolatile memory. The computation device and the storage device serve as a local host and a remote device, respectively. According to the UniPro specification, a bidirectional link is created between the host and the device. In a variant embodiment, a plurality of (a maximum of four) lanes are disposed between the host and the device and arranged in any transport directions. Accordingly, the host and the device each have functions required to process a plurality of lanes required for processing a circuit according to the interconnection protocol of the UniPro specification.

The UFS standard uses the UniPro specification to define a plurality of protocol layers in a link layer. The protocol layers include a physical adapter layer, data link layer, network layer and transport layer. The data link layer is disposed between the network layer and the physical adapter layer. The data link layer deals with data stream control and error processing. The UniPro specification mainly defines functions of the protocol layers and defines a conceptual service access point model to regulate the interfaces for the services provided by the protocol layers, and thus technical solutions proposed by researchers and complying with the UniPro specification may require hardware, firmware or software. In a situation where multiple lanes are required, a frame processed by the data link layer during each unit clock period has 4, 8, or more symbols. Therefore, from the perspective of the efficiency of throughput of data transport in its entirety, it is important to send the data contained in the frames to the network layer efficiently while the data link layer is efficiently receiving symbols of a plurality of frames.

BRIEF SUMMARY OF THE INVENTION

An embodiment of the present disclosure provides a technology for data processing of frame receiving of an interconnection protocol, for use in a first device linkable to a second device according to an interconnection protocol. The technology, in processing of frames originating from the second device and received by the first device, involves: pre-fetching symbols of a second frame of a data link layer by a hardware protocol engine while sending data contained in a first frame to a network layer from the data link layer; and sending data contained in the second frame to the network layer, after the data contained in the first frame are sent to the network layer and the symbols of the second frame are pre-fetched. Therefore, upon receipt of a plurality of back-to-back frames, the technology is conducive to the enhancement of the efficiency of the frame receiving of the data link layer.

A method for data processing of frame receiving of an interconnection protocol and a storage device are provided according to embodiments of the present disclosure.

An embodiment provides a method for data processing of frame receiving of an interconnection protocol, for use in a first device linkable to a second device according to the interconnection protocol. The method, in processing of frames originating from the second device and received by the first device, comprises: a) fetching symbols of a first frame of a data link layer and sending data contained in the first frame to a network layer by a hardware protocol engine dedicated to the first device and configured to implement the interconnection protocol; b) pre-fetching symbols of a second frame of the data link layer by the hardware protocol engine while sending the data contained in the first frame to the network layer; and c) sending data contained in the second frame to the network layer, after the data contained in the first frame are sent to the network layer and the symbols of the second frame are pre-fetched.

An embodiment provides a storage device operable to link to a host according to an interconnection protocol. The storage device comprises an interface circuit, a device controller and a hardware protocol engine. The interface circuit is configured to implement a physical layer of the interconnection protocol so as to link to the host. The device controller is configured to be coupled to the interface circuit and a storage module. The device controller comprises a hardware protocol engine configured to implement the interconnection protocol. In processing of frames from the host received by the storage device, the hardware protocol engine performs a plurality of operations. The operations include: a)

the hardware protocol engine fetches symbols of a first frame of a data link layer and sends data contained in the first frame to a network layer; b) while sending the data contained in the first frame to the network layer, the hardware protocol engine pre-fetches symbols of a second frame of the data link layer; and c) after the data contained in the first frame have been sent to the network layer and the symbols of the second frame have been pre-fetched, the hardware protocol engine sends data contained in the second frame to the network layer.

In some embodiments of the method or storage device, when the hardware protocol engine receives a plurality of back-to-back frames, the hardware protocol engine performs the operations a) to c) on the back-to-back frames until the back-to-back frames are sent to the network layer, so as to enhance efficiency of the frame receiving of the data link layer.

In some embodiments of the method or storage device, in the step a) or the operation a), the hardware protocol engine fetches the symbols of the first frame from a memory buffer region, and temporarily stores the symbols of the first frame in a first temporary storage region and a second temporary storage region repeatedly.

In some embodiments of the method or storage device, in the step b) or the operation b), the hardware protocol engine pre-fetches the symbols of the second frame from the memory buffer region, and temporarily stores the symbols of the second frame in the first temporary storage region and the second temporary storage region repeatedly.

In some embodiments of the method or storage device, in the step b) or the operation b), the hardware protocol engine performs decomposition on the symbols of the first frame in the first temporary storage region and the second temporary storage region and performs alignment by determination of an end of frame in the symbols of the first frame and an end of frame of a previous frame, so that the data contained in the first frame is sent to the network layer.

In some embodiments of the method or storage device, in the step c) or the operation c), the hardware protocol engine performs decomposition on the symbols of the second frame in the first temporary storage region and the second temporary storage region and performs alignment by determination of a start of frame in the symbols of the second frame and a start of frame of a next frame, so that the data contained in the second frame is sent to the network layer.

In some embodiments of the method or storage device, the interconnection protocol is the Universal Flash Storage (UFS) standard.

DETAILED DESCRIPTION OF THE INVENTION

To facilitate understanding of the objectives, characteristics and effects of this present disclosure, embodiments together with the attached drawings for the detailed description of the present disclosure are provided.

An embodiment of the present disclosure provides a technology for data processing of frame receiving of an interconnection protocol, for use in a first device linkable to a second device according to the interconnection protocol. The technology, in processing of frames originating from the second device and received by the first device, involves: pre-fetching symbols of a second frame while data contained in a first frame is being sent from a data link layer to a network layer; sending data contained in the second frame to the network layer, after the data contained in the first frame are sent to the network layer and the symbols of the second frame are pre-fetched. Therefore, upon receipt of a plurality of back-to-back frames, the technology is conducive to the enhancement of the efficiency of the frame receiving of the data link layer.

Figure 1:
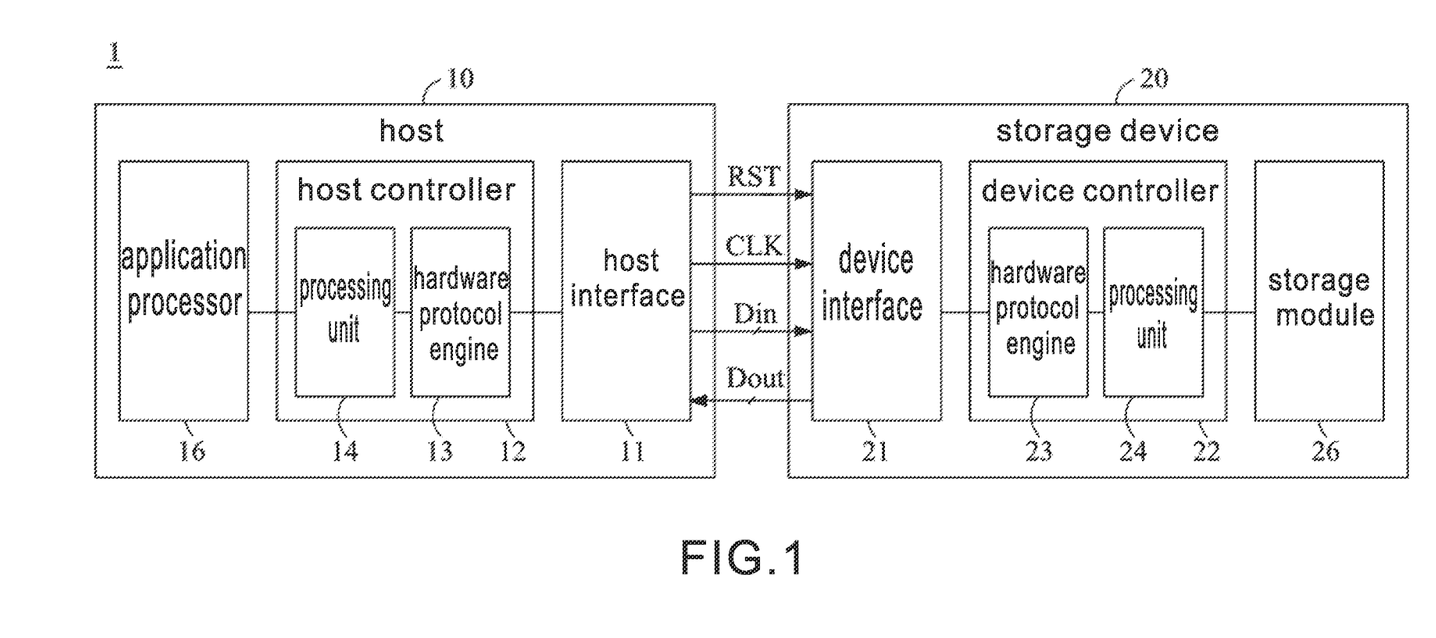
FIG. 1 is a block diagram of a storage system according to an embodiment of the present disclosure.
Figure 2:
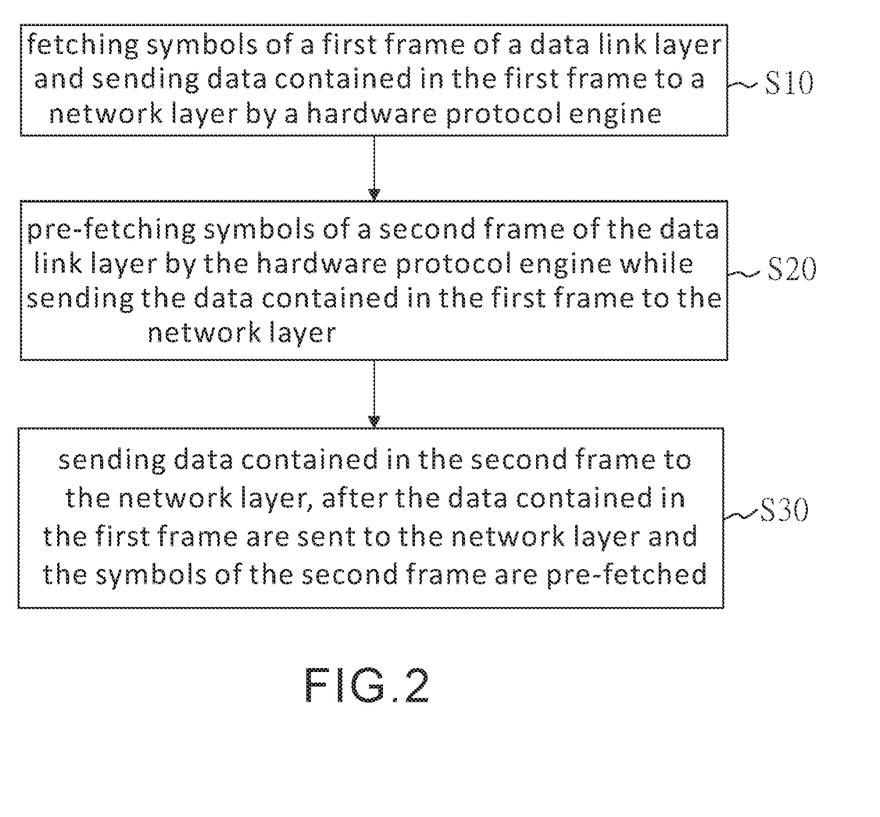
FIG. 2 is a schematic view of a process flow of a method for data processing of frame receiving of an interconnection protocol according to an embodiment of the present disclosure.

For illustrative sake, the technology provides an embodiment of a circuit framework. The circuit framework has sufficient flexibility required to be effectively configured to meet the needs of various products in order to be adapted to the designs made by various manufacturers and thus is conducive to product development. As shown in FIG. 1, to apply the circuit framework to a storage system 1, a controller (such as a host controller 12) of a host 10 of the storage system 1 and a controller (such as a device controller 22) of a storage device 20 of the storage system 1 are each a circuit framework comprising a hardware protocol engine and a processing unit. The processing units of the controllers are optional. The method for use with the technology for use in configuring the information of an interconnection protocol is illustrated by FIG. 2.

Referring to FIG. 1, there is shown a block diagram of a storage system according to an embodiment of the present disclosure. As shown in FIG. 1, the storage system 1 comprises the host 10 and storage device 20. Communication between the host 10 and the storage device 20 takes place according to an interconnection protocol to allow the host 10 to access data on the storage device 20. The interconnection protocol is, for example, the Universal Flash Storage (UFS) standard. The host 10 is, for example, a computation device, such as a smartphone, tablet, or multimedia device. The storage device 20 is, for example, a storage device disposed inside or outside the computation device, such as a storage device with nonvolatile memory. The storage device 20 writes data under the control of the host 10 or provides written data to the host 10. The storage device 20 can be a solid-state storage device (SSD), multimedia card (MMC), embedded MMC (eMMC), secure digital memory card (SD) or universal flash storage (UFS) device, but the present disclosure is not limited thereto.

The host 10 comprises a host interface 11, host controller 12 and application processor 16.

The host interface 11 is configured to implement a physical layer of the interconnection protocol so as to link to the storage device 20. For example, the host interface 11 is configured to implement a physical (M-PHY) layer which meets the UFS standard.

The host controller 12 is coupled between the host interface 11 and the application processor 16. To access data on the storage device 20, the application processor 16 sends an access operation command to the host controller 12 through the communication between the interconnection protocol and the storage device 20.

The host controller 12 comprises a hardware protocol engine 13 and a processing unit 14. The processing unit 14 is optional.

The hardware protocol engine 13 is configured to implement a protocol layer of the interconnection protocol. Take the interconnection protocol being the UFS standard as an example, the protocol layer is a Unified Protocol (UniPro) layer. The hardware protocol engine 13 communicates with and converts information with respect to the host interface 11 and the processing unit 14 according to the specification of the protocol layer.

The processing unit 14 is coupled to the hardware protocol engine 13 and configured to communicate with the application processor 16. The processing unit 14 executes one or more firmware elements. For example, access operation commands generated and sent from applications (App), drivers, or operating systems executed by the application processor 16 are converted by firmware executed by the processing unit 14 to acquire a protocol layer command format which satisfies the interconnection protocol, and then the access operation commands proceed to the hardware protocol engine 13 so as to be processed according to specifications of the protocol layer. The firmware, for example, is stored in the internal memory of the processing units 14 or the internal memory of the host controller 12. The internal memory comprises volatile memory and/or nonvolatile memory.

The storage device 20 comprises a device interface 21, device controller 22, and storage module 26.

The device interface 21 is configured to implement a physical layer of the interconnection protocol so as to link to the host 10. For example, the host interface 21 is configured to implement a physical (M-PHY) layer which meets the UFS standard.

The device controller 22 is coupled between the device interface 21 and the storage module 26. The device controller 22 controls the write operation, read operation, or erase operation of the storage module 26. The device controller 22 exchanges data with the storage module 26 through an address bus or data bus. The storage module 26 is, for example, a memory chip which includes one or more nonvolatile memories.

The device controller 22 comprises a hardware protocol engine 23 and a processing unit 24. The processing unit 24 is optional.

The hardware protocol engine 23 is configured to implement a protocol layer of the interconnection protocol. Take the interconnection protocol being the UFS standard as an example, the protocol layer is a UniPro layer. The hardware protocol engine 13 communicates with and converts information with respect to the device interface 21 and the processing unit 24 according to the specification of the protocol layer.

The processing unit 24 is coupled to the hardware protocol engine 23 and configured to communicate with the host 10 through the device interface 21. The processing unit 24 executes one or more firmware elements. For example, the processing unit 24 executes one or more firmware elements to control or instruct the storage module 26 to perform the write operation, read operation, or erase operation, so as to process information from the hardware protocol engine 23 or send the information to the hardware protocol engine 23. The firmware elements are, for example, stored in an internal memory of the processing unit 24, an internal memory of the device controller 22, or a specific storage region of the storage module 26. The internal memory comprises volatile memory and/or nonvolatile memory.

Referring to FIG. 1, the host interface 11 is coupled to the device interface 21 by data lines Din, Dout for sending/receiving data, a reset line RST for sending hardware reset signals, and clock line CLK for sending data. There are multiple pairs of data lines Din, Dout, one of which is known as a lane. The host interface 11 communicates with the device interface 21 with at least one interface protocol. The interface protocols include mobile industry processor interface (MIPI), Universal Flash Storage (UFS), small computer system interface (SCSI), or serial attached SCSI (SAS), but the present disclosure is not limited thereto. Given the UFS standard, a plurality of sub-links is disposed between the host 10 and storage device 20, so as to enhance the efficiency of transport. Conventionally, a maximum of two lanes are disposed between and arranged in the direction from the host 10 to the storage device 20 or in the direction from the storage device 20 to the host 10, and the plurality of lanes are activated or deactivated.

The controllers (such as the host controller 12 or device controller 22) shown in FIG. 1 each comprise a hardware protocol engine and a processing unit. The method for data processing of frame receiving of an interconnection protocol is described below.

Referring to FIG. 2, there is shown a schematic view of a process flow of a method for data processing of frame receiving of an interconnection. The method is for use with a first device (such as storage device 20) operable to link to a second device (such as host 10) according to an interconnection protocol. For illustrative sake, the description below is based on the first device being the storage device 20 and the second device being the host 10. As shown in FIG. 2, the method comprises steps S10~S30 executable in the course of processing of frames originating from the second device (such as host 10) and received by the first device (such as storage device 20) by a hardware protocol engine (such as hardware protocol engine 23) dedicated to the first device (such as storage device 20) and configured to implement the interconnection protocol according to the interconnection protocol.

Step S10 involves fetching symbols of a first frame of a data link layer and sending data contained in the first frame to a network layer by a hardware protocol engine dedicated to the first device and configured to implement the interconnection protocol.

Step S20 involves pre-fetching symbols of a second frame of the data link layer by the hardware protocol engine while sending the data contained in the first frame to the network layer.

Step S30 involves sending data contained in the second frame to the network layer, after the data contained in the first frame are sent to the network layer and the symbols of the second frame are pre-fetched.

In some embodiments, when the hardware protocol engine receives a plurality of back-to-back frames, the hardware protocol engine carries out steps S10, S20 and S30 to the back-to-back frames the until the back-to-back frames are sent to the network layer, so as to enhance efficiency of the frame receiving of the data link layer.

In some embodiments, in step S10, the hardware protocol engine fetches symbols of the first frame from a memory buffer region and temporarily stores the symbols of the first frame in a first temporary storage region and a second temporary storage region repeatedly.

In some embodiments, in step S20, the hardware protocol engine pre-fetches symbols of the second frame from the memory buffer region and temporarily stores the symbols of the second frame in the first temporary storage region and the second temporary storage region repeatedly.

In some embodiments, in step S20, the hardware protocol engine performs decomposition on the symbols of the first frame in the first temporary storage region and the second temporary storage region and performs alignment by determination of an end of frame in the symbols of the first frame and an end of frame of a previous frame, so that the data contained in the first frame is sent to the network layer.

In some embodiments, in step S30, the hardware protocol engine performs decomposition on the symbols of the second frame in the first temporary storage region and the second temporary storage region and performs alignment by determination of a start of frame in the symbols of the second frame and a start of frame of a next frame, so that the data contained in the second frame is sent to the network layer.

In the embodiment illustrative of the method of FIG. 2, the first device and the second device are exemplified by the storage device 20 and the host 10, respectively, but the method is also applicable to the situation where the first device and the second device are the host 10 and the storage device 20, respectively.

The description below is exemplified by the scenario where the interconnection protocol is the Universal Flash Storage (UFS) standard. The UFS standard includes a UFS command set (USC) layer, UFS transport protocol (UTP) layer, and UFS interconnect (UIC) layer. The UIC layer comprises a link layer and a physical layer. The link layer is defined according to UniPro specifications. The physical layer is defined according to M-PHY specifications.

Figure 3:
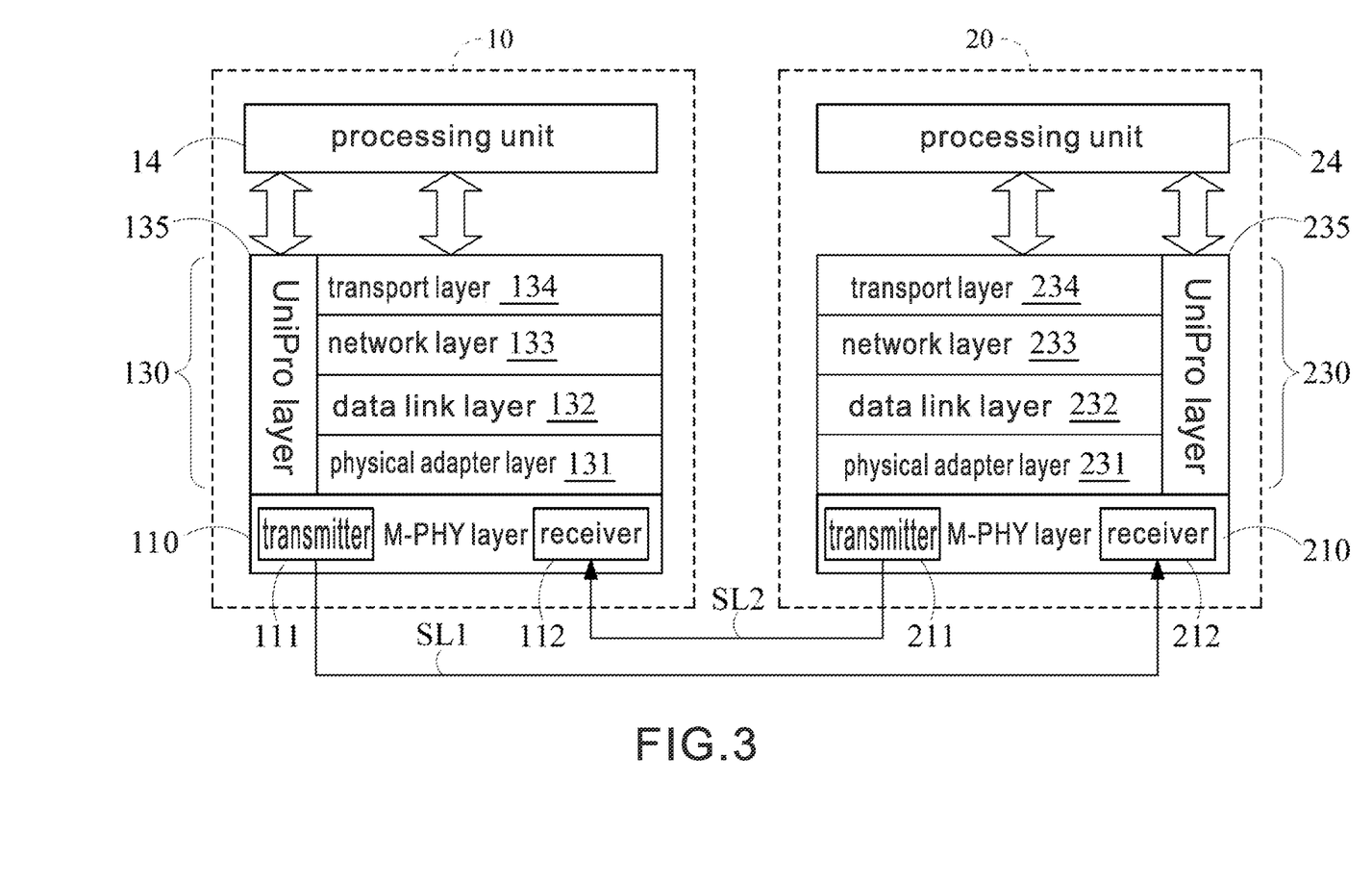
FIG. 3 is a schematic view of a layered framework of the storage system of FIG. 1 in accordance with the UFS standard.

Referring to FIG. 3, there is shown a schematic view of a layered framework of the storage system of FIG. 1 in accordance with the UFS standard. Since the UFS standard is based on the MIPI Unified Protocol (UniPro) layer and MIPI physical (M-PHY) layer, the host interface 11 and hardware protocol engine 13 shown in FIG. 1 are configured to implement an M-PHY layer 110 and a UniPro layer 130 shown in FIG. 3, respectively, whereas the device interface 21 and hardware protocol engine 23 shown in FIG. 1 are configured to implement the M-PHY layer 210 and UniPro layer 230 shown in FIG. 3, respectively.

As shown in FIG. 3, the UniPro layer 130 (or 230) comprises a physical adapter layer (PHY adapter layer, PA) 131 (or 231), data link layer (DL) 132 (or 232), network layer 133 (or 233) and transport layer 134 (or 234). All the layers in the UniPro layer 230 of the storage device 20 can be similarly operated and implemented.

The physical adapter layer (131 or 231) is configured to couple the M-PHY layer (110 or 210) to the data link layer (132 or 232). The physical adapter layer (131 or 231) carries out bandwidth control and power management between the M-PHY layer (110 or 210) and data link layer (132 or 232). The M-PHY layer 110 of the host 10 comprises a transmitter 111 and a receiver 112. The M-PHY layer 210 of the storage device 20 comprises a transmitter 211 and a receiver 212, thereby creating data lanes SL1 and SL2 to achieve full-duplex communication. The UniPro specification supports the presence of a plurality of data lanes at the link in each transport direction (such as forward or reverse).

The data link layer (132 or 232) is executed to facilitate the flow control of data transport between the host 10 and the storage device 20. Thus, the data link layer (132 or 232) monitors data transport or controls data transport speed. The data link layer (132 or 232) executes error control based on cyclic redundancy check (CRC). The data link layer (132 or 232) uses packets received from the network layer (133 or 233) to generate frames or uses frames received from the physical adapter layer (131 or 231) to generate packets.

The network layer (133 or 233) is for use in the routing function of selecting transport paths, regarding the packets received from the transport layer (134 or 234).

The transport layer (134 or 234) uses a command received from the UFS application layer to configure a data segment suitable for a protocol and sends the data segment to the network layer (133 or 233) or fetches a command from packets received by the network layer (133 or 233) and sends the command to the UFS application layer. The transport layer (134 or 234) adopts a sequence-based error control solution to ensure the effectiveness of data transport.

The UniPro layer (130 or 230) defines therein a Device Management Entity (DME) (135 or 235) in communication with all the layers in the M-PHY layer (110 or 210) and UniPro layer (130 or 230), such as physical adapter layer (131 or 231), data link layer (132 or 232), network layer (133 or 231) and transport layer (134 or 234), and thus in communication with the UFS application layer, so as to implement functions, such as control-related or configuration-related functions, for example, start, shut down, reset, power consumption mode change, required for the integrity of the Unified Protocol (UniPro).

Figure 4:
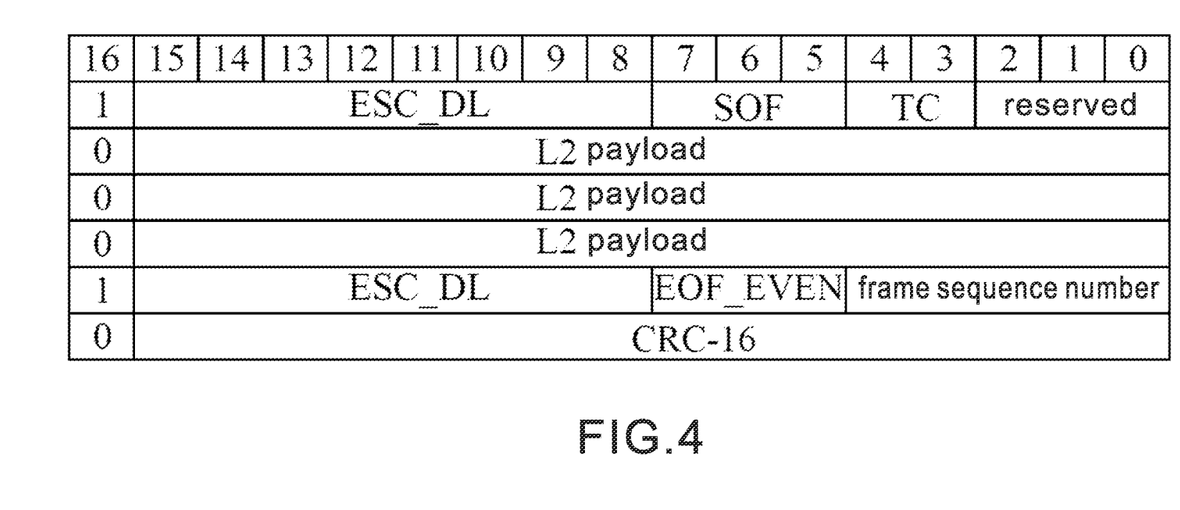
FIG. 4 is a schematic view of the format of data frames of the data link layer in accordance with the UniPro standard.

Referring to FIG. 4, there is shown a schematic view of the format of data frames of the data link layer in accordance with the UniPro standard. As shown in FIG. 4, when the data contained in the payload (known as L2 payload) of the data frame is 0 bytes, the data frame comprises at least four protocol data units (such as four 16-bit data), wherein one of the protocol data units includes a Start Of Frame (SOF). The Protocol Data Unit which includes a start of frame (SOF) further includes a Traffic Class (TC) mark, for example, TC0 and TC1 denote priority levels. ESC_DL mark indicates that the frame is a frame of the data link layer. EOF_EVEN (or EOF_ODD) indicates an End Of Frame (EOF). CRC-16 denotes Cyclic Redundancy Check (CRC) code. The frame shown in FIG. 4 is deemed at least including a plurality of symbols (or known as Protocol Data Units, PDU). In the diagram or description below, for example, SOF, Dx0, . . . , Dxy, EOF, CRC indicate a frame inclusive of a plurality of symbols, where x denotes the frame, y denotes the $y^{th}$ symbol of the frame x. For instance, D00 denotes the first symbol of the first frame, whereas D01 denotes the second symbol of the first frame. L2 payloads can be in a plural number, and thus the frame can contain four or more symbols.

With a plurality of sub-links being activated, frame transmission entails transmitting symbols of a frame synchronously through a plurality of sub-links, wherein each symbol indicates 16-bit valid data. For instance, in the UFS standard, according to MIPI M-PHY v4.x specifications, the width of data from M-PHY to PA layer is, at the maximum, one lane with 32 bits and two lanes with 64 bits.

To increase data throughput, an embodiment of the present disclosure discloses implementing M-PHY having one lane with 64 bits and two lanes with 128 bits, going beyond the limitation placed by conventional M-PHY specifications in accordance with the UFS standard. Thus, the width of data from the PA layer to the DL layer is one lane with 4 symbols and two lanes with 8 symbols. Therefore, the width of data during each clock period is, at the maximum, 8 symbols. During any one clock period of the receiver (RX) of DL layer, DL data frame and the next data frame may be arranged back to back (SOF+TC0 Data #0+EOF+CRC+ SOF+TC0 data #1+EOF+CRC+ . . . )

In practice, after the DL layer has received symbols of the frames from the PA layer, the symbols are stored in a buffer region (implemented by nonvolatile memory, such as SRAM), and the storing process entails writing data to the buffer region. Furthermore, processing the frames by the DL layer, for example, getting an affirmative result of CRC, then removing the header (for example, SOF symbols) and the end (for example, EOF_EVEN or EOF_ODD and CRC symbols), and sending user data to the network layer above; the processing process entails reading data from the buffer region. Since the aforesaid two processes are carried out at unequal speeds (for example, because of writing quickly but reading slowly, or for any other reasons related to internal operation). If the frame receiving of the DL layer is not implemented with the method of FIG. 2, there will be a time lag between the end of upward transport of each frame and the commencement of transport of the next frame because of the aforesaid unequal speeds. The time lag is hereinafter referred to as idle time. As a result, the efficiency of the frame receiving of the DL layer is subjected to limitation. In addition, when the DL layer is not implemented with the method of FIG. 2, there will be idle time between the frames being transported upward even if the frames received are back-to-back frames.

Steps S10, S20, S30 of the method illustrated by FIG. 2 entail: pre-fetching symbols of a second frame of a data link layer by a hardware protocol engine while sending the data contained in the first frame to the network layer from the data link layer; and sending data contained in the second frame to the network layer, after the data contained in the first frame are sent to the network layer and the symbols of the second frame are pre-fetched. Therefore, upon receipt of a plurality of back-to-back frames, the idle time between the frames being transported upward is reduced or precluded, thereby enhancing the efficiency of the frame receiving of the DL layer. Therefore, when implementing a product, frame receiving efficiency can be enhanced by carrying out the method of FIG. 2 at the sending end and the receiving end and transporting the frames back-to-back.

Figure 5:
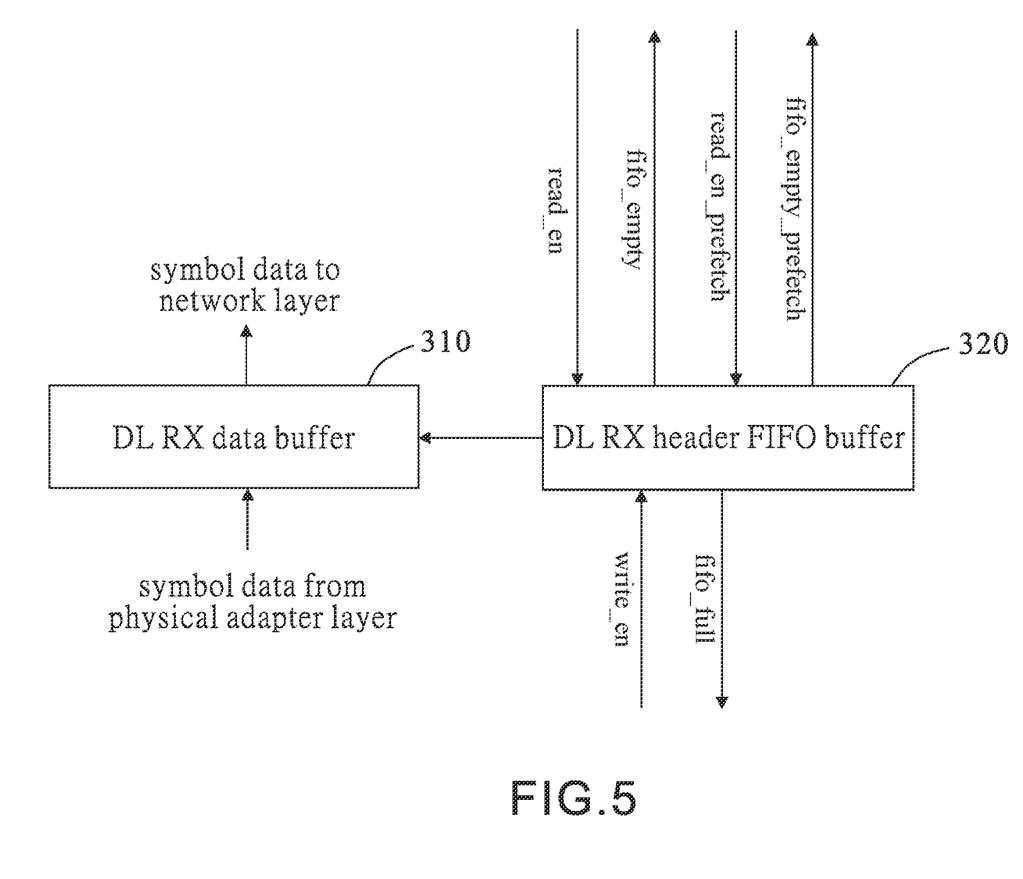
FIG. 5 is a schematic view of a circuit for implementing the method for data processing of frame receiving of an interconnection protocol according to an embodiment of the present disclosure.

Referring to FIG. 5, there is shown a schematic view of a circuit framework for implementing the method of FIG. 2 according to an embodiment of the present disclosure. As shown in FIG. 5, the data link layer (132 or 232) in the hardware protocol engine of the storage device and the host is implemented with the method of FIG. 2.

In an embodiment, a data link layer receiver (DL RX) data buffer (or data buffer for short) 310 and a data link layer receiver (DL RX) header FIFO (first-in first-out) buffer (or header FIFO buffer for short) 320 are implemented on the data link layer (132 or 232). Data frames from the physical adapter layer (PA layer) are stored in the data buffer 310. The header FIFO buffer 320 stores the information of each data frame, such as header position (such as SOF), offset, sequence number, byte counts. When an upper layer (such as network layer) is ready, DL RX fetches from the data buffer 310 the received data according to the information in the header FIFO buffer 320. In FIG. 5, the data buffer 310 and header FIFO buffer 320 are configured to implement two asynchronous clock domains for transmitting data; for example, transmitting data between two different clock domains of the physical adapter layer and the network layer. The data buffer 310 and header FIFO buffer 320 are an embodiment of asynchronous FIFO to not only use a control flag (or signal) fifo_empty, fifo_full, read_en, write_en of asynchronous FIFO but also further increase two pre-fetching read control flags read_en_prefetch and a flag (or signal) of fifo_empty_prefetch according to the means of pre-fetching of the method of FIG. 2. Circuits for use with different traffic class (TC), for example, frames of TC0, TC1, are implemented with the asynchronous FIFO framework of FIG. 5.

Figure 6:
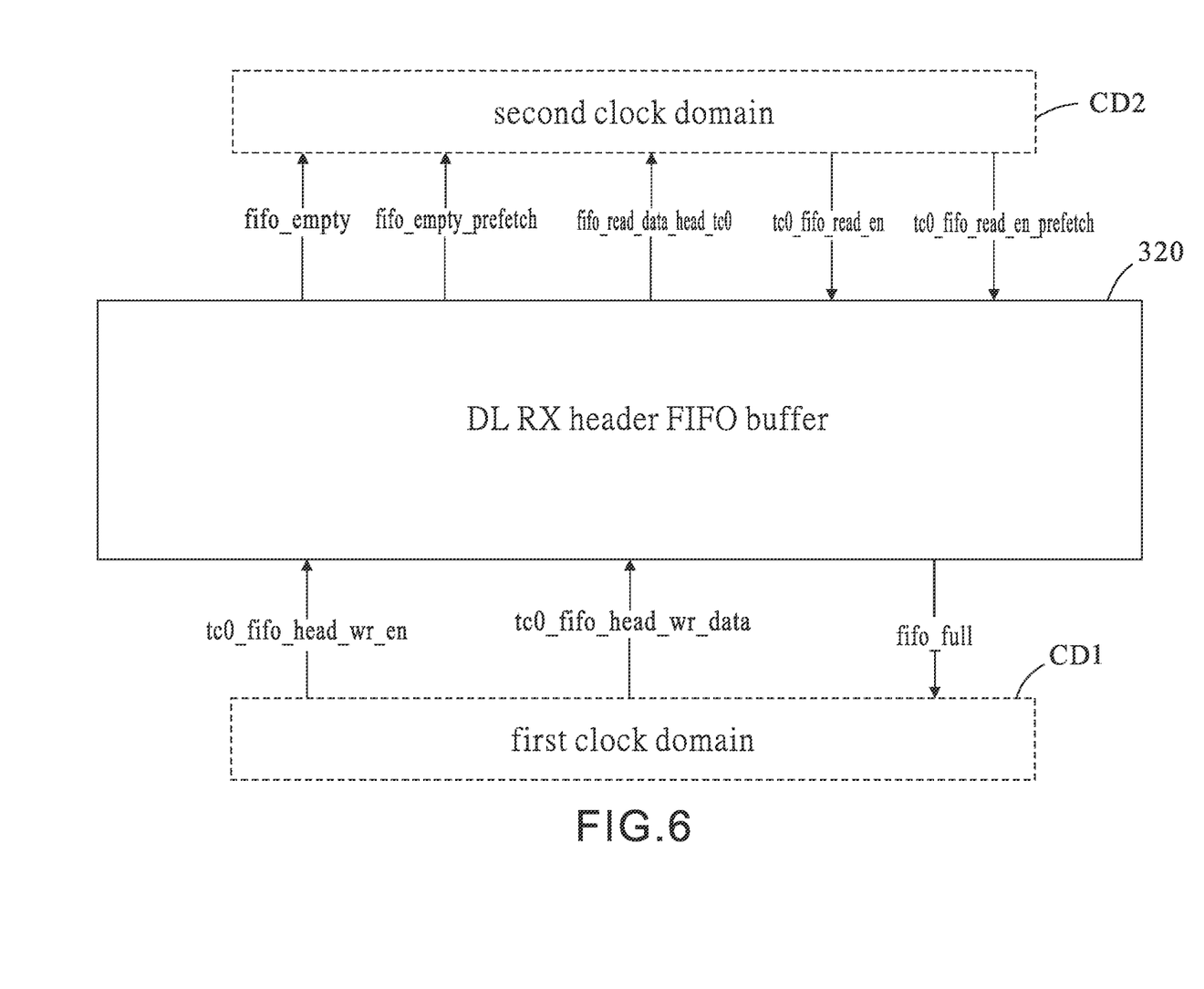
FIG. 6 is a schematic view of a header FIFO buffer for DL RX in FIG. 5 according to another embodiment of the present disclosure.

FIG. 6 is a schematic view of the header FIFO buffer 320 in FIG. 5 according to another embodiment of the present disclosure. For instance, FIG. 6 shows that the frames of traffic class TC0 are implemented according to the header FIFO buffer 320 of FIG. 5. Thus, as shown in FIG. 6, some of the plurality of flags of FIG. 5 come with "tc0" for the sake of differentiation. To reduce idle time and increase throughput, the header FIFO buffer 320 of FIG. 6 not only uses a pair of specified pre-fetching read control flag tc0_fifo_read_en_prefetch and fifo_empty_prefetch but also uses some read control flags, such as fifo_empty, fifo_read_data_head_tc0, tc0_fifo_read_en, tc0_fifo_head_wr_en, tc0_fifo_head_wr_data, fifo_full. In FIG. 6, for example, the lower dashed line box indicates that first clock domain CD1 is exemplified by receiver (RX) clock domain (RMMI RX clock domain for short), also known as RX symbol clock domain, of Reference M-PHY Module Interface (RMMI), whereas the upper dashed line box indicates that second clock domain CD2 is exemplified by CPort clock domain. For instance, RMMI RX clock domain and CPort clock domain are implemented according to the UFS standard and UniPro specification. The CPort clock domain is a circuit dedicated to the upper layer and the DL layer and operated according to a specific clock. The RMMI RX clock domain is a circuit dedicated to PA layer and the DL layer and operated according to another clock. As shown in FIG. 6, the header FIFO buffer 320 uses pre-fetching read control flag fifo_empty_prefetch to inform the second clock domain CD2 as to whether, at the present moment, pre-fetching can take place or not, whereas the second clock domain CD2 uses pre-fetching read control flag read_en_prefetch to inform the header FIFO buffer 320 as to whether, at the present moment, the upper layer is ready.

Figure 7:
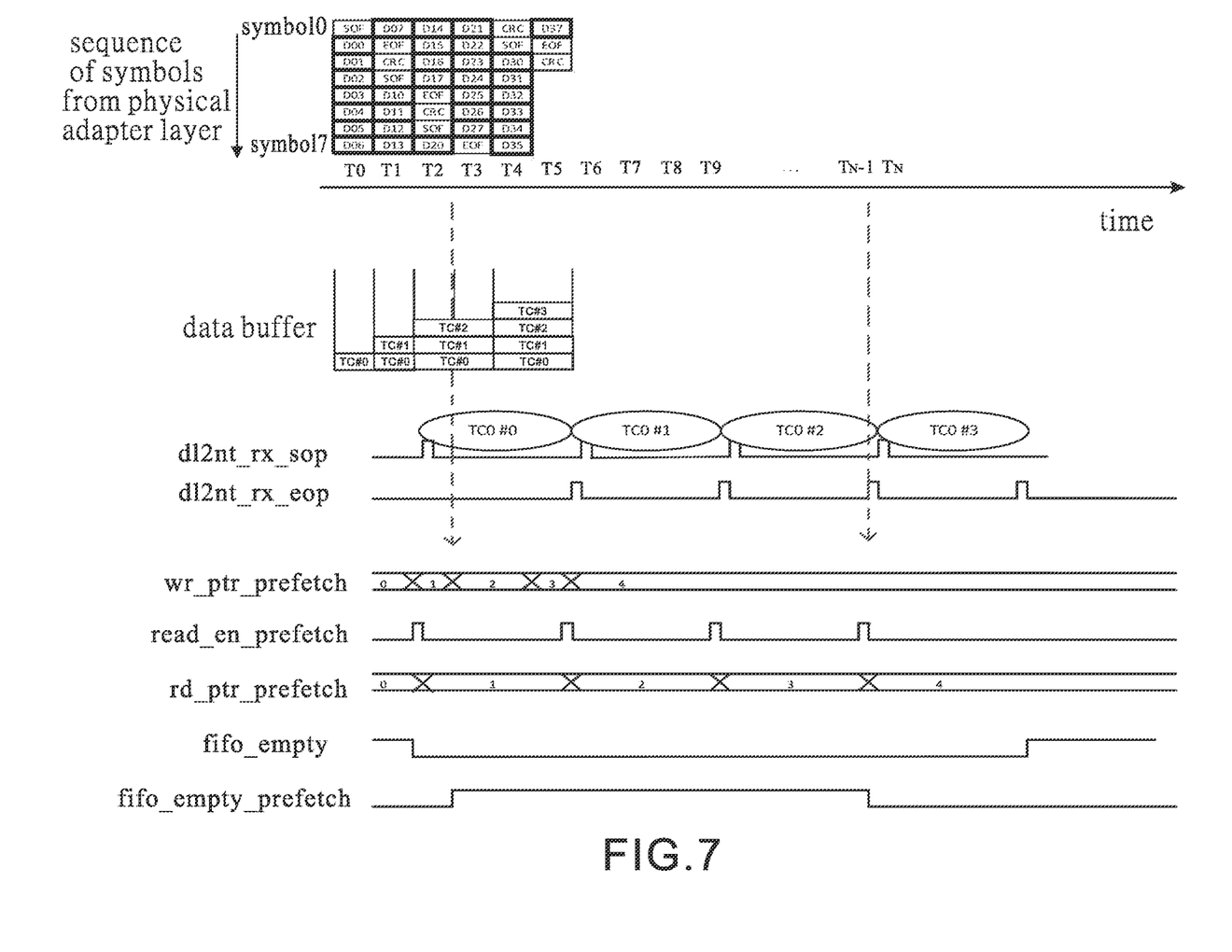
FIG. 7 is a schematic view of data processing of frame receiving, as implemented by the method of FIG. 2 according to an embodiment of the present disclosure.

To implement the pre-fetching in the method illustrated by FIG. 2, it is desirable for the following embodiments to illustrate the functions of the pre-fetching read control flag and related DL RX, with detailed time sequence information shown in FIG. 7. An embodiment of the method of FIG. 2 comprises process flow (1)~(5).

Process flow (1): according to step S10, when DL RX begins fetching data frames, it is necessary to predetermine read enable flag read_en_prefetch regarding the mode of pre-fetching, for example, incrementing rd_ptr_prefetch by 1. After DL RX in FIG. 7 has finished sending each data frame to the upper layer r, it is necessary to set the read enable (read_en) flag for use in the general mode of fetching as opposed to pre-fetching, and DL RX updates credit values of flow rate control in parallel. In every instance of fetching data from the data buffer 310, the fetched data are repeatedly stored in two registers (known as current register and delay register) configured to implement the method of FIG. 2 and serve as the first temporary storage region and second temporary storage region of the method of FIG. 2, respectively. The aforesaid operation remains unchanged regardless of whether it applies to general fetching or pre-fetching; thus, each instance of pre-fetching or fetching data from the data buffer 310 is followed by storing the pre-fetched or fetched data in the two registers repeatedly.

Process flow (2): according to step S20, when each data frame is almost transported to the upper layer r (for example, in the situation where few remaining symbols have to wait for the next or two clock periods in order to be sent to the upper layer r), DL RX checks fifo_empty_prefetch flag to determine whether there are any next data frames (as opposed to wr_ptr_prefetch and rd_ptr_prefetch) to be processed, whereas DL RX also parallelly determines whether any frame back-to-back event has occurred and thus pre-fetching has to be carried out. If DL RX confirms a frame back-to-back event, DL RX will pre-fetch data, seamlessly (this process requires two operations, namely decomposition and alignment) send data during the next clock period to the upper layer r to become back-to-back with the previous data frame, and set pre-fetching mode read enable (read_en_prefetch) flag again (in a way similar to process flow (1)). As shown in FIG. 7 which is a time sequence diagram, after an end of frame of a previous data frame (EOP for short) flag (d12nt_rx_eop) has been set to enable (such as high level) during a specific clock period, the start mark (SOP for short) flag (d12nt_rx_sop) of the next data frame is set to enable (such as a high level) during the ensuing clock period. If DL RX confirms that no frame back-to-back event has happened, it will terminate the processing of the current data frame and return to the idle state.

Figure 10:
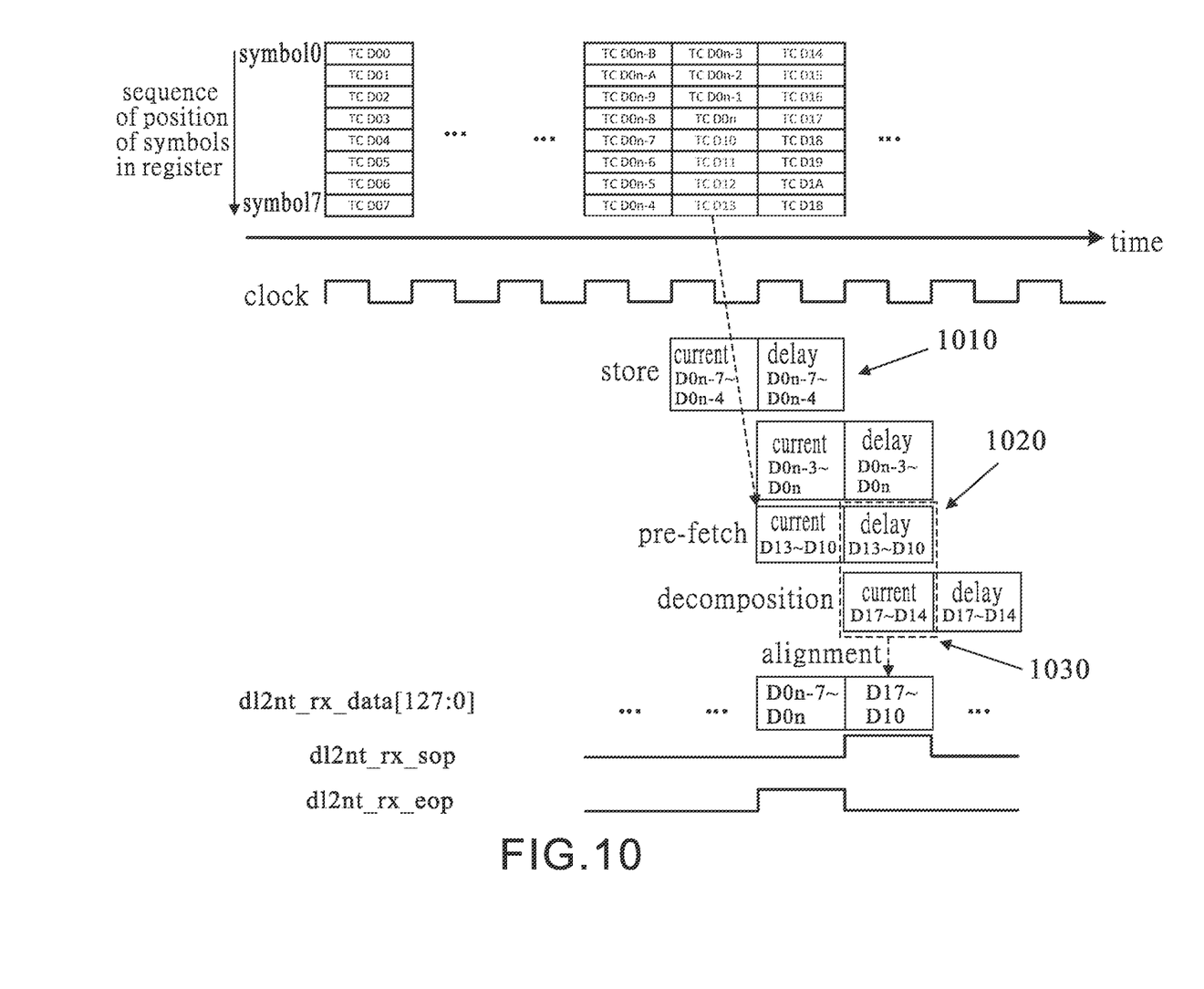
FIG. 10 is a schematic view of data processing of frame receiving, as implemented by the method of FIG. 2 according to an embodiment of the present disclosure.

Process flow (3): in process flow (2), when the condition of pre-fetching is not satisfied, DL RX decomposes the symbol of the current register into an end symbol of the current frame and a start symbol of the next frame. During the same clock period, DL RX aligns the end symbol of the current frame and the symbol of the delay register to attain a complete "current frame termination" (d12nt_rx_eop=1) and sends the complete frame to the upper layer r, as shown in FIG. 10. In this embodiment, each data frame is back-to-back stored in the receiver (RX) buffer region. Therefore, the start symbols of each data frame may have one address offset (The address offset is, for example, four symbols).

Process flow (4): according to step S30, after DL RX has finished sending each frame end to the upper layer r, DL RX updates the credit values of flow rate control. During the next clock period, DL RX aligns the symbols in the delay register (the start symbols of the next frame) and the current register to attain a complete "next frame start" (d12nt_rx_sop=1), such that the idle time between the back-to-back frames can be reduced or precluded, as shown in FIG. 10. The remaining data frames are processed by the aforesaid decomposition and alignment operations.

Process flow (5) Repeat process flow (2) through process flow (4). If the final data is pre-fetched and the data buffer 310 has therein no data frame, i.e., when wr_ptr_prefetch is equal to rd_ptr_prefetch, the fifo_empty_prefetch flag will be set to de-asserted (such as low level).

Referring to FIG. 7, there is shown a schematic view of data processing of frame receiving, as implemented by the method of FIG. 2 according to an embodiment of the present disclosure. As shown in FIG. 7, Tn denotes the number of clock periods in the first clock domain (such as RMMI RX clock domain or known as RX symbols clock domain). In FIG. 7, the upper cells contain the symbols from the physical adapter layer, and the symbols are arranged in the data buffer (310 in FIG. 5) of the receiver according to the order of receipt and time sequence of receipt. The symbols in the cells are presented in the form of the abbreviations used in FIG. 4. In FIG. 7, the stacking patterns of the cells of the data buffer below the time axis vary with time. For illustrative sake, the received frames in the data buffer are denoted by TC or TC #m, for example, m denotes the sequence number of a frame of traffic class TC0.

During clock period T0/T1: the host starts sending the next rows of frames. DL RX stores TC #0 in the data buffer of DL RX.

When fifo_empty is low level, it means that the data buffer is not empty, and DL RX starts obtaining from the data buffer the received data and sends the data to the network layer after TC #0 data in the data buffer have been ready.

During clock period T2: if the next data frame TC #1 is already present in the DL RX data buffer, DL RX will set fifo_empty_prefetch flag to active state.

During clock period T4: when TC #0 is about to be fully transported, DL RX pre-fetches TC #1 (fifo_empty_prefetch is high level).

During clock period T5: after TC #0 has been transported, DL RX sends TC #1 so that it is seamlessly back-to-back with TC #0.

During clock period T8: when TC #1 is about to be fully transported, DL RX pre-fetches TC #2 (fifo_empty_prefetch is high level).

During clock period T9: after TC #1 has been transported, DL RX sends TC #2, so that it is seamlessly back-to-back with TC #1.

During clock period TN−1: if DL RX pre-fetches TC #3, and no data frame which needs to be processed is presented in the DL RX data buffer, DL RX will set fifo_empty_prefetch flag to inactive state (meanwhile, wr_ptr_prefetch is equal to rd_ptr_prefetch).

In FIG. 7, pulse waves in the waveforms corresponding to start mark flag d12nt_rx_sop correspond to the start of a specific frame (such as TC0 #0, TC0 #1, TC0 #2, TC0 #3), whereas pulse waves in the waveforms corresponding to the end mark flag d12nt_rx_eop correspond to the end of a specific frame (such as TC0 #0, TC0 #1, TC0 #2, TC0 #3). Referring to FIG. 7, the time sequence diagram, after an end flag d12nt_rx_eop of a previous data frame has been set to "enable" (such as high level) during a specific clock period, start mark flag d12nt_rx_sop of the next data frame is set to enable (such as high level) in the ensuing clock period. Therefore, DL RX sends symbols of back-to-back frames to the network layer, so as to reduce or preclude idle time, thereby enhancing transport efficiency.

Figure 8:
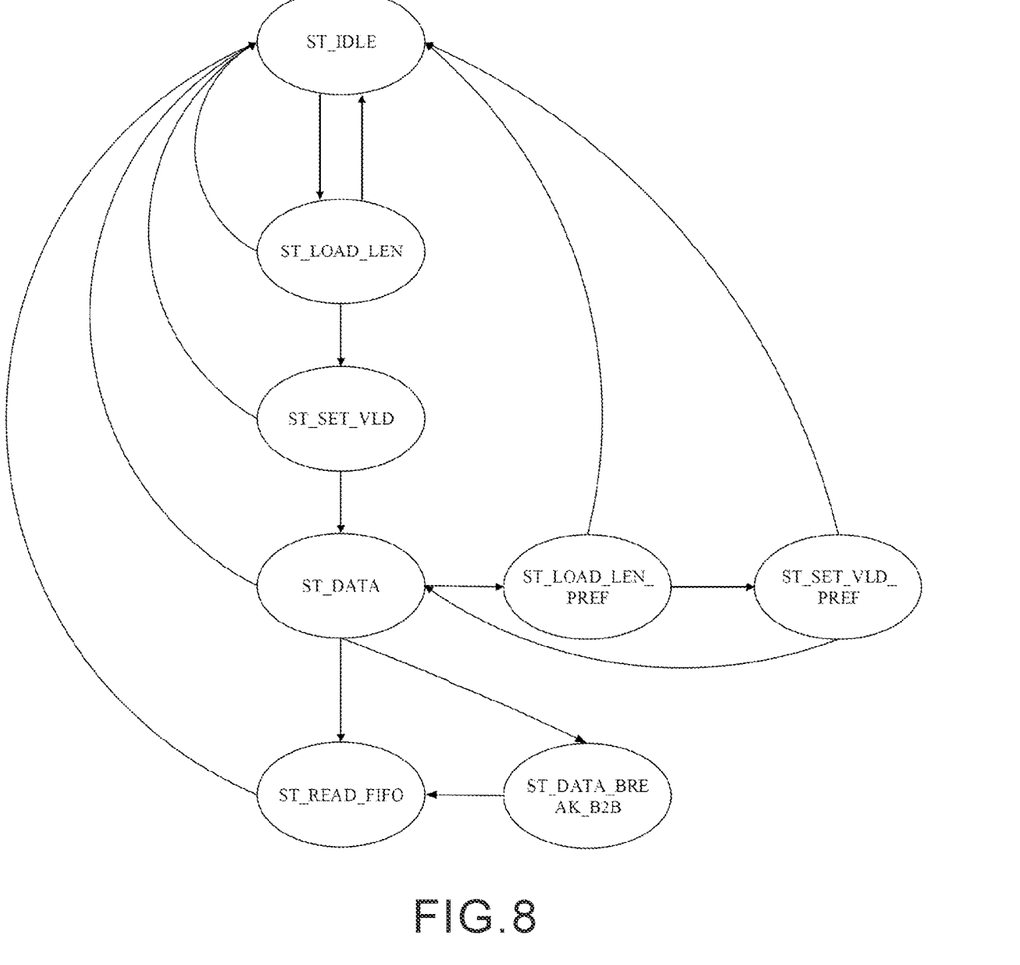
FIG. 8 is a schematic view of a state machine implemented by the method of FIG. 2 according to an embodiment of the present disclosure.
Figure 9:
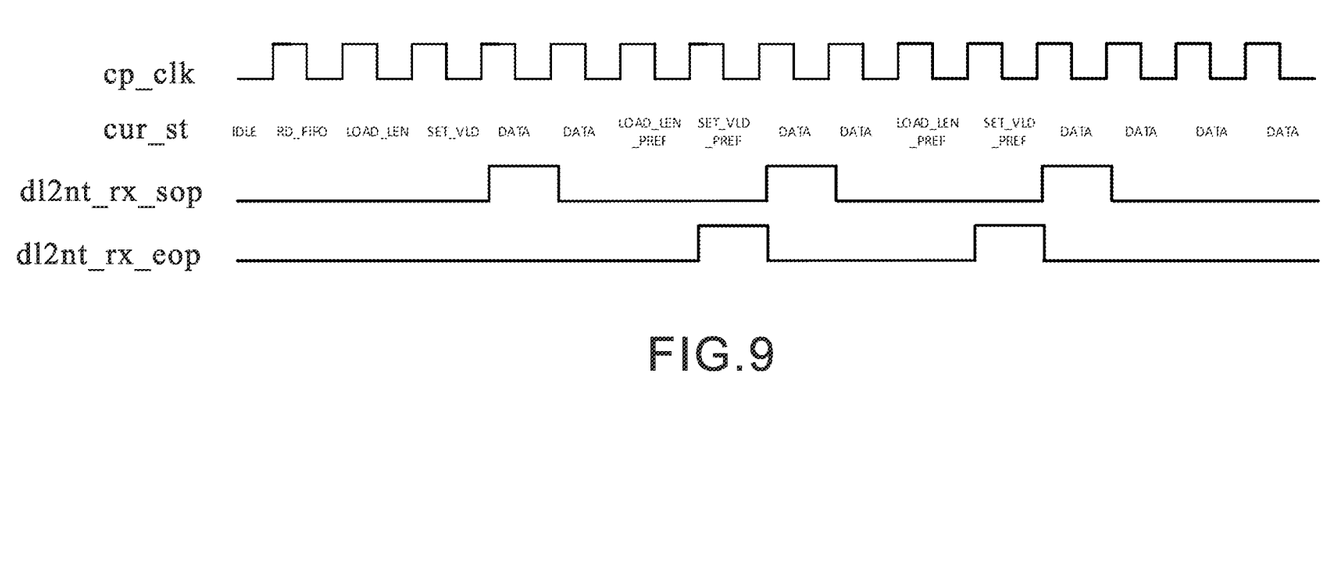
FIG. 9 is a schematic view of time sequence of the state machine of FIG. 8 according to an embodiment of the present disclosure.

Referring to FIG. 8, there is shown a schematic view of a state machine implemented by the method of FIG. 2 according to an embodiment of the present disclosure. FIG. 9 is a schematic view of time sequence of the state machine of FIG. 8 according to an embodiment of the present disclosure. The state machine in FIG. 9 can be implemented in the second clock domain CD2 of DL RX in FIG. 6 to perform the frame receiving process with the method illustrated by FIG. 2 and transport the frames to the network layer above; under the condition of transporting the frames back-to-back, the chance of being idle is effectively reduced or precluded, thereby enhancing the efficiency of frame receiving.

Referring to FIG. 8, various states of the state machine are described below.

1. ST_IDLE: await in this state until FIFO is not empty, and then enter the next state, ST_LOAD_LEN.

2. ST_LOAD_LEN: load data frame length during one period, and then enter the next state, ST_SET_VLD.

3. ST_SET_VLD: set d12nt_rx_valid to 1 from 0 during one period, and then enter the next state ST_DATA.

4. ST_LOAD_LEN_PREF: pre-fetch the next data frame length during one period, and then enter the next state, ST_SET_VLD_PREF.

5. ST_SET_VLD_PREF: set d12nt_rx_valid to 1 from 0 during one period, with the frames back-to-back, and then enter the next state, ST_DATA.

6. ST_DATA: keep sending data until the required data frame length is attained. First, if back-to-back frames are arriving and there is time available to load the next frame data to implement back-to-back, go to ST_LOAD_LEN_PREF. Second, if back-to-back frames are arriving but there is no time available to load the next frame data to implement back-to-back, go to ST_DATA_BREAK_B2B. Third, if no data remains, go to the next state ST_READ_FIFO.

7. ST_DATA_BREAK_B2B: if FIFO is not empty, go to the next state ST_LOAD_LEN, otherwise go to the next state ST_READ_FIFO.

8. ST_READ_FIFO: send FIFO read pulse ejection data. The transport of frame information has finished, and then go to the next state ST_IDLE.

In FIG. 8, when the condition of a specific state is not satisfied, it means that the flag (nt2d1_rx_abort) of exiting the state is set to enable, and the state machine returns to the initial state ST_IDLE.

Referring to FIG. 10, there is shown a schematic view of data processing of frame receiving, as implemented by the method of FIG. 2 according to an embodiment of the present disclosure.

FIG. 10 illustrates the method (storing, pre-fetching, decomposition, and alignment) of FIG. 7. As shown in FIG. 10, the two blocks indicated by arrow 1010 mean that, after fetching data (such as symbols D0n~7~D0n-4) from the data buffer 310, the fetched data are stored in two registers, such as current register and delay register, repeatedly. The two blocks indicated by arrow 1020 mean that, after pre-fetching data (such as symbols D13~D10) from the data buffer 310, the pre-fetched data are stored in two registers, such as current register and delay register, repeatedly. The two blocks indicated by arrow 1030 mean that, DL RX performs decomposition on the symbols of the current register and delay register and performs alignment on the symbols (such as symbols D13~D10, D17~D14). Therefore, in DL RX, TC data frames (such as symbols D0n~7~D0n, D17~D10) are back-to-back sent to the upper layer r according to the SOP-EOP frame structure, and its performance is enhanced in the absence of idle time (for example, when d12nt_rx_sop and d12nt_rx_eop are enable during two consecutive clock periods, respectively.)

In the aforesaid embodiment of the host and the storage device, the hardware protocol engine of the host controller or device controller is designed according to a Hardware Description Language (HDL), such as Verilog language, or the technology of designing digital circuits which persons skilled in the art are familiar with, and implemented with one or more circuits of Field Programmable Gate Array (FPGA), Application Specific Integrated Circuit (ASIC), or Complex Programmable Logic Device (CPLD), or implemented with dedicated circuits or modules. The host controller or device controller (or its processing unit or hardware protocol engine) can also be implemented by a microcontroller, processor, or digital signal processor.

While the present disclosure has been described by means of specific embodiments, numerous modifications and variations could be made thereto by those skilled in the art without departing from the scope and spirit of the present disclosure set forth in the claims.

What is claimed is:

1. A method for data processing of frame receiving of an interconnection protocol, for use in a first device linkable to a second device according to the interconnection protocol, the method comprising:
   in processing of frames originating from the second device and received by the first device:
   a) fetching symbols of a first frame of a data link layer and sending data contained in the first frame to a network layer by a hardware protocol engine of the first device, the hardware protocol engine implementing the interconnection protocol;
   b) while sending the data contained in the first frame to the network layer, pre-fetching symbols of a second frame of the data link layer by the hardware protocol engine; and
   c) after the data contained in the first frame are sent to the network layer and the symbols of the second frame are pre-fetched, sending data contained in the second frame to the network layer;
   wherein in step a), the hardware protocol engine fetches symbols of the first frame from a memory buffer region and temporarily stores the symbols of the first frame in a first temporary storage region and a second temporary storage region repeatedly; and
   wherein in step b), the hardware protocol engine pre-fetches symbols of the second frame from the memory buffer region, and temporarily stores the symbols of the second frame in the first temporary storage region and the second temporary storage region repeatedly.

2. The method according to claim 1, wherein when the hardware protocol engine receives a plurality of back-to-back frames, the hardware protocol engine performs the steps a) to c) on the back-to-back frames until the back-to-back frames are sent to the network layer.

3. The method according to claim 1 wherein in the step b), the hardware protocol engine performs decomposition on the symbols of the first frame in the first temporary storage region and the second temporary storage region and performs alignment by determination of an end of frame in the symbols of the first frame and an end of frame of a previous frame, so that the data contained in the first frame is sent to the network layer.

4. The method according to claim 3, wherein in the step c), the hardware protocol engine performs decomposition on the symbols of the second frame in the first temporary storage region and the second temporary storage region and performs alignment by determination of a start of frame in the symbols of the second frame and a start of frame of a next frame, so that the data contained in the second frame is sent to the network layer.

5. The method according to claim 1, wherein the interconnection protocol is Universal Flash Storage (UFS) standard.

6. A storage device, operable to link to a host according to an interconnection protocol, the storage device comprising:
- an interface circuit, configured to implement a physical layer of the interconnection protocol so as to link to the host; and
- a device controller, configured to be coupled to the interface circuit and a storage module, the device controller comprising:
- a hardware protocol engine, configured to implement the interconnection protocol, wherein in processing of frames originating from the host and received by the storage device, the hardware protocol engine performs a plurality of operations, the plurality of operations including:
  a) the hardware protocol engine fetches symbols of a first frame of a data link layer and sends data contained in the first frame to a network layer;
  b) while sending the data contained in the first frame to the network layer, the hardware protocol engine pre-fetches symbols of a second frame of the data link layer; and
  c) after the data contained in the first frame have been sent to the network layer and the symbols of the second frame have been pre-fetched, the hardware protocol engine sends data contained in the second frame to the network layer;
- wherein the hardware protocol engine is configured to fetch symbols of the first frame from a memory buffer region and temporarily store the symbols of the first frame in a first temporary storage region and a second temporary storage region, repeatedly, and wherein the protocol engine is additionally configured to pre-fetch symbols of the second frame from the memory buffer region, and temporarily stores the symbols of the second frame in the first temporary storage region and the second temporary storage region repeatedly.

7. The storage device according to claim 6, wherein when the hardware protocol engine receives a plurality of back-to-back frames, the hardware protocol engine performs the operations a) to c) on the back-to-back frames until the back-to-back frames are sent to the network layer.

8. The storage device according to claim 6, wherein in the operation b), the hardware protocol engine performs decomposition on the symbols of the first frame in the first temporary storage region and the second temporary storage region and performs alignment by determination of an end of frame in the symbols of the first frame and an end of frame of a previous frame, so that the data contained in the first frame is sent to the network layer.

9. The storage device according to claim 8, wherein in the operation c), the hardware protocol engine performs decomposition on the symbols of the second frame in the first temporary storage region and the second temporary storage region and performs alignment by determination of a start of frame in the symbols of the second frame and a start of frame of a next frame, so that the data contained in the second frame is sent to the network layer.

10. The storage device according to claim 6, wherein the interconnection protocol is Universal Flash Storage (UFS) standard.

* * * * *